United States Patent [19]

Sagey

[11] Patent Number: 5,099,245
[45] Date of Patent: Mar. 24, 1992

[54] VEHICLE LOCATION SYSTEM ACCURACY ENHANCEMENT FOR AIRBORNE VEHICLES

[75] Inventor: William E. Sagey, Orange, Calif.

[73] Assignee: Hughes Aircraft Company, Los Angeles, Calif.

[21] Appl. No.: 349,985

[22] Filed: May 8, 1989

Related U.S. Application Data

[63] Continuation of Ser. No. 112,870, Oct. 23, 1987, abandoned.

[51] Int. Cl.$^5$ ............................ G01S 5/14; H04B 7/185
[52] U.S. Cl. .................................... 342/357; 342/463; 342/454
[58] Field of Search ............... 342/352, 356, 357, 450, 342/451, 453–456, 458, 463–465

[56] References Cited

U.S. PATENT DOCUMENTS

| | | | |
|---|---|---|---|
| 3,836,970 | 9/1974 | Reitzig | 342/352 |
| 3,916,410 | 10/1975 | Elwood | 342/458 |
| 3,941,984 | 3/1976 | Chappell et al. | 342/357 X |
| 3,988,734 | 10/1976 | Elwood | 342/464 |
| 4,077,005 | 2/1978 | Bishop | 342/357 X |
| 4,232,313 | 11/1980 | Fleishman | 342/36 |
| 4,240,079 | 12/1980 | Zhilin | 342/352 |
| 4,359,733 | 11/1982 | O'Neill | 342/357 |
| 4,596,988 | 6/1986 | Wanka | 342/457 |
| 4,613,864 | 9/1986 | Hofgen | 342/357 |
| 4,652,884 | 3/1987 | Starker | 342/357 |
| 4,740,792 | 4/1988 | Sagey et al. | 342/457 |
| 4,742,357 | 5/1988 | Rackley | 342/457 |
| 4,751,512 | 6/1988 | Longaker | 342/357 |

FOREIGN PATENT DOCUMENTS

0174540 3/1986 European Pat. Off. .
2180425 3/1987 United Kingdom .

OTHER PUBLICATIONS

Navigation: Journal of the Institute of Navigation, vol. 13, No. 4, Winter 1966–1967, pp. 353–366, "The Potential Use of Satellites in Hyperbolic Position Finding", G. W. Casserly et al.

"Methods of Radio Determination for Inmarsat", G. Frenkel, Mar. 1978, pp. 37–38, Maritime and Aeronautical Sattellite Communication and Navigation.

PCT/US88/03474 International Search Report.

*Primary Examiner*—John B. Sotomayor
*Attorney, Agent, or Firm*—Wanda K. Denson-Low

[57] ABSTRACT

A vehicle location system incorporating a plurality of ground enhancement stations and at least one satellite to receive encoded transmissions from a radio transmitter aboard a user vehicle. The satellite transmits the signals received directly from the user and those relayed by the ground enhancement station to a base station where a computer calculates the position of the user on the basis of the time difference between the time of arrival of the signals. The use of the ground enhancement stations, located throughout the area in which the user is to be located provides lower geometric dilution of precision than purely satellite or purely ground base systems, and in combination with the relatively simple transmitter aboard the vehicle and transponders at the ground enhancement stations and satellite, substantially reduces the cost of deployment of such a system. Means may be provided to give the results of the calculation of position to the user by a radio link from the satellite or a ground enhancement station.

42 Claims, 11 Drawing Sheets

GEOMETRY OF TETRAHEDRON DEFINING GDOP

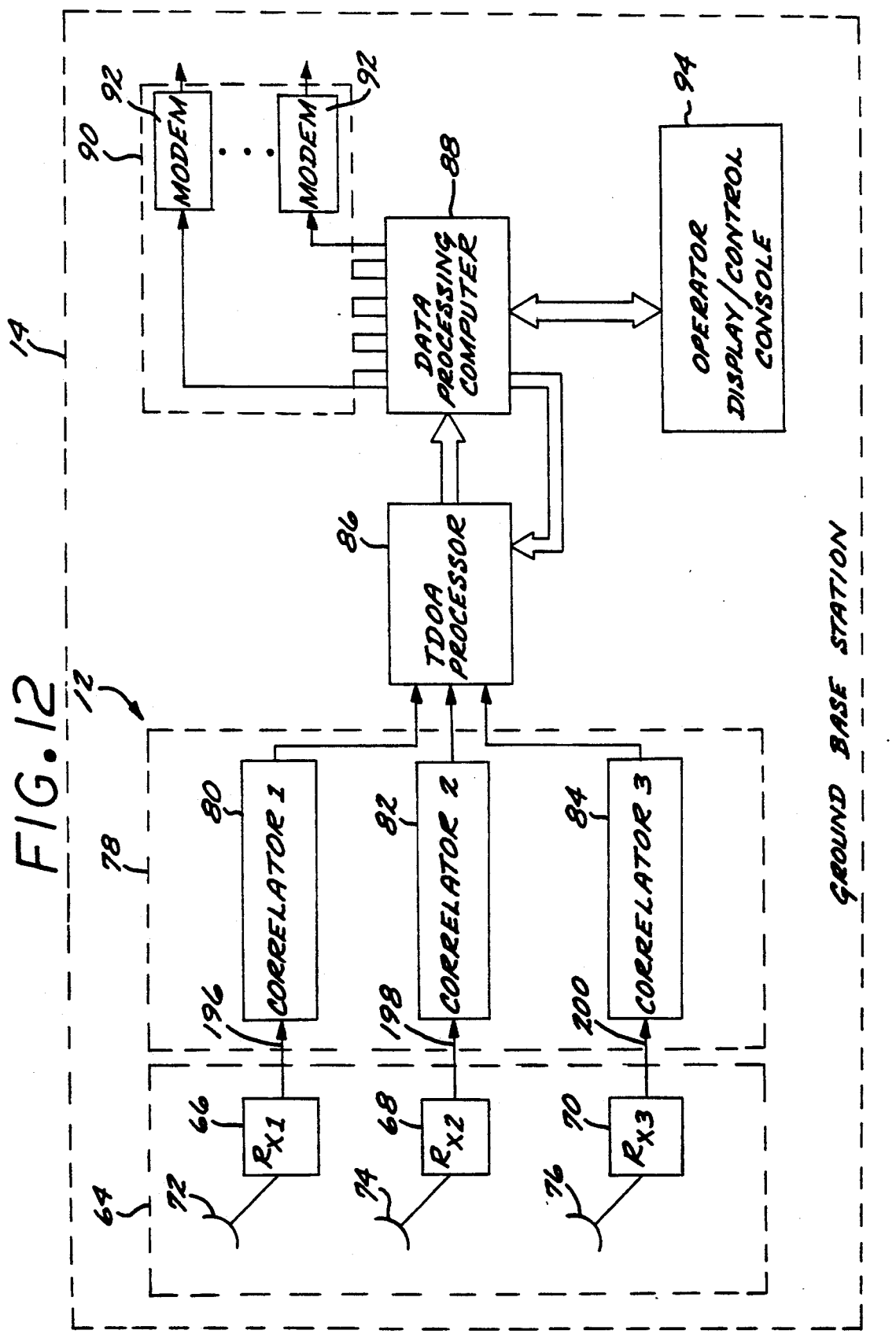

VEHICLE LOCATION SYSTEM ACCURACY ENHANCEMENT FOR AIRBORNE VEHICLES

This application is a continuation of application Ser. No. 112,870, filed Oct. 23, 1987 now abandoned.

BACKGROUND OF THE INVENTION

This invention relates to vehicle locating systems and more specifically to vehicle locating systems useful in an air traffic control environment which is based upon the use of satellite and ground station components to provide location accuracies superior to those based entirely upon either satellite or ground station components alone.

As air traffic has increased, it has become desirable to reduce the separation between aircraft and thereby increase the available capacity of the nation's controlled air space. The air traffic control system in the United States has as its primary performance criterion the safety of air traffic. Under such circumstances and criterion, uncertainty of the location of aircraft directly translates into large separation requirements between aircraft. Furthermore, present systems which are primarily radar based require the use of transponders aboard the aircraft which must be set by the pilot to a predetermined code in order to identify the aircraft. If the aircraft is equipped with a mode C transponder, altitude may be transmitted on the transponder's signal to an interrogating radar, but such an altitude signal is dependent upon the availability on the aircraft of an altitude encoder in addition to the radar transponder. Radar coverage does not exist throughout the United States but is generally concentrated in areas of high population or frequent on-route flights. As a result, the air traffic control system is severely limited in it's capacity in areas where radar coverage is not available and only the pilot's reporting of position may be relied upon to locate the aircraft. As a result, large separations between aircraft must be provided.

In the present air traffic control system, location of aircraft is provided to a human air traffic controller who provides separation and conflict alerting on the basis of the enhanced radar display before him. While certain computerized conflict alert systems are available, such systems are not very useful in highly congested areas, since the location accuracies of the radar system and the performance envelopes of the aircraft cause many false alarms. Thus, poor location accuracy reduces the air traffic system capacity and the ability to perform computed conflict alert in congested air space.

Satellite based vehicle location systems, such as the Geostar System described in U.S. Pat. No. 4,359,733, dated Nov. 16, 1982 have been proposed to address the accuracy and capacity problems of the existing air traffic control system and to automate the reporting of potential conflicts to pilots based upon information derived from computer determination of aircraft location for aircraft equipped with the appropriate electronic equipment. However, such systems have generally required relatively expensive airborne equipment and complex and expensive satellite systems in order to provide the services required. Furthermore, while they are capable of providing improved accuracies compared to radar based systems and coverage of essentially all of the continental United States by the use of a few satellites, such systems suffer from Geometric Dilution of Precision (GDOP) due to the small crossing angles of the hyperbola of lines of position derived from the vehicle transmissions. For geostationary satellite repeater systems, GDOP factors greater than 100 are typical. A system constructed with ground based repeaters would suffer from a similar GDOP problem in the elevation plane, since the crossing angles of the lines of position for such a system are also small. These magnitudes of GDOP require larger than desired spacing between aircraft.

From the above, it is obvious that neither the systems based entirely on a satellite or satellites nor the systems based entirely on a ground station or stations satisfies the positional accuracy and cost requirements of a next generation air traffic control system. Such a system should minimize the cost and complexity of airborne and spaceborne components and still require a relatively small number of ground stations while providing continental United States coverage.

SUMMARY OF THE INVENTION

The present invention provides improvements to a satellite based vehicle location system (VLS) such as the system described in U.S. Pat. No. 4,740,792, Sagey et al., assigned to Hughes Aircraft Company and incorporated herein by reference. The basic VLS system according to the invention relies upon a relatively small number of simple transponder satellites that receive encoded messages from a transmitter located on an airborne vehicle and retransmits them to a common base station. The position of the airborne user is derived from the time difference of arrival (TDOA) of the signals relayed by the satellites.

The present invention involves the use of unattended strategically based ground enhancement stations that precisely delay retransmission of a signal received from an airborne vehicle. The ground enhancement stations retransmit the signal to the satellites with an added data signal to identify the particular ground enhancement station that is transmitting. The satellites, acting as "bent pipe" transponders, retransmit this information to the common ground base station that incorporate the ability to calculate the position of the airborne vehicle on the basis of the known geometry of the satellites and ground enhancement stations and the TDOA (time difference of arrival) of the received signals. By the use of the above system the relatively large Geometric Dilution of Precision (GDOP) present in entirely ground based or entirely space based systems is dramatically decreased by superimposing the relatively steep lines of constant time delay of the ground based system upon the relatively shallow lines of constant time delay of the satellite based systems, thereby providing a much more accurate measure of the location of the transmitting vehicle.

The hybrid system according to the present invention employs aircraft signal reception and retransmission at at least one ground enhancement station and three satellites to provide greatly reduced GDOP compared to systems consisting only of repeaters located at a satellite or satellites. Furthermore, if the aircraft is in range of at least two ground enhancement stations, a further reduction of the GDOP factor is attained compared to the case when the user aircraft is in range of only one ground enhancement station. The highest accuracies (and lowest GDOP) occur in an overdetermined (i.e. redundant navigational data) system with approximately seven ground stations surrounding a Terminal Control Area (TCA) of an airport. The common base station computer can then select the set of signals that produce optimum geometry for lowest GDOP.

The present invention utilizes a simple and inexpensive transmitter aboard each aircraft that is designed to incorporate a code unique to that vehicle. The transmitter is designed to be operational the entire time that the aircraft is being operated, including when it is being taxied on the taxiways at the airport; however, during taxi operations, the duty cycle is selected to be relatively long in a preferred embodiment. All signals are short duration pulses employing spread spectrum pseudonoise modulation for the purpose of achieving high range resolution and good discrimination between overlapping signals from multiple aircraft. This waveform design is totally compatible with that employed in the aforementioned U.S. Pat. No. 06/901,086. Thus, the transmitter of the present invention provides means of uniquely identifying each aircraft while it is being operated, but the simplicity of the transmitter prevents unnecessary costs for aircraft operating within the system. The aircraft may also be equipped with a conflict alert receiver which is capable of receiving a message designed to alert the pilot that a potential collision is developing between his aircraft and that of another. A conflict alert system could also incorporate means to provide the pilot with a suggested course of action to avoid the conflict. Such a conflict avoidance message would be based upon the calculation of the position and projected position of all aircraft in the system and various collision avoidance criteria programmed into a central computer in the base station.

The signal transmitted by the airborne user is received by one or more satellites and a plurality of ground stations within the line of sight and range of the transmitter. The frequency of the transmitter is chosen to provide for reliable line of sight communication between the airborne vehicle and the satellite and ground stations. The satellite portion of the system incorporates relatively simple satellites, preferably located at synchronous altitudes, which provide a "bent pipe" transponder system to relay the signal received from the airborne vehicle to a remote ground base station without processing the signal in any way. The satellites are tracked and their precise location determined by separate means, such as dedicated tracking stations or a satellite tracking network. The satellite retransmits the signals received from the airborne vehicle on a narrow beam to an antenna located at the ground base station. The ground base station incorporates a plurality of narrow beam receiving antennas, each of which is pointed at its respective satellite, so that the satellites may all operate at a similar frequency without interfering with one another. Alternatively, different frequencies may be assigned to each satellite and their signals separated upon receipt by a single wide beam antenna.

A plurality of ground enhancement stations are located throughout the United States to provide coverage of airborne vehicles and to receive the transmissions of the airborne vehicle transmitters. Each ground enhancement station then retransmits the signals received from the airborne vehicles on a new frequency (to allow simultaneous transmissions and receptions from more than one aircraft), superimposing upon the signal the ground station identification. The time of retransmission is precisely controlled so that the integrity of the measurement system is preserved. The ground base station then calculates the position of the airborne user based upon the known locations of the satellites and the various ground enhancement stations and the time difference of arrival (TDOA) of the signals transmitted directly from the airborne user to the satellite and the relayed signals through the ground enhancement stations.

The location accuracy of a vehicle location system according to the invention is substantially enhanced in that the Geometric Dilution of Precision (GDOP) associated with either all satellite or all ground based schemes is substantially reduced. This reduction in GDOP is possible because the crossing angles of the hyperbola of constant time delay for ground stations and the hyperbola of constant time delay for satellites is substantially greater than the crossing angle from satellite to satellite or ground station to ground station for most available geometries. When such crossing angles approach 90° the errors associated with accuracy of time delay measurement are greatly reduced, since such errors are manifest in increased radii of the hyperbola generated. When the hyperbola meet at shallow angles, the area of uncertainty is much larger than when they meet at relatively steep angles and the area of uncertainty is minimized when the crossing angles approach 90°. The present invention provides these improved accuracies while minimizing the expense of the airborne, spaceborne and land based elements of the system, since none of these components require complex electronics or computing capability except for a small number of central processing base stations designed to derive position and determine potential conflicts.

Thus, the system of the present invention represents a substantial improvement in accuracy and a decrease in cost compared to previous systems. Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 12 illustrates the arrangement of the components of the ground base station of an embodiment in accordance with the present invention.

DETAILED DESCRIPTION

As shown in the exemplary drawings, the invention is embodied in a vehicle locating system that uses both satellite based and ground based transponders to relay signals from an airborne user's transmitter to a ground base station at which the calculation of the position of the airborne user is made, based upon the known geometry and locations of the satellites and ground base stations and the time differences between the receipt of the various signals at the ground station. The present invention uses relatively inexpensive and simple components for the radio frequency portions of the airborne users' equipment, the ground stations and the satellite systems and concentrates the computational and conflict resolution capability in one or more relatively large and complex ground based facilities. Previous vehicle location systems that were either entirely satellite based or entirely ground based have required relatively large numbers of complex electronic assemblies and computer systems deployed with the users and/or satellites to provide the vehicle location services required.

One problem associated with such previous systems is the GDOP associated with the relatively shallow angles of intersection of the hyperbola of constant time delay for an airborne user in satellite systems, in which the satellites are at geosynchronous orbit. Using such a system, any error in measurement in time of arrival of the signal at the satellite from the airborne user or, conversely, at the airborne user from a signal emanating from the satellite, results in fairly large errors due to this geometry. Similarly, entirely ground based systems suffer from relatively limited regional coverage and GDOP errors unless a very large number of ground based stations are used to assure adequate geometry between airborne user and a multiplicity of stations, thereby allowing a favorable geometry to be chosen.

Spacecraft or airborne systems that perform the calculation of vehicle location at either the aircraft or the spacecraft, furthermore, suffer from the fact that such remote and unmanned locations must contain a fairly substantial and expensive computational capability compared to the concept of the present invention.

Figure 1:
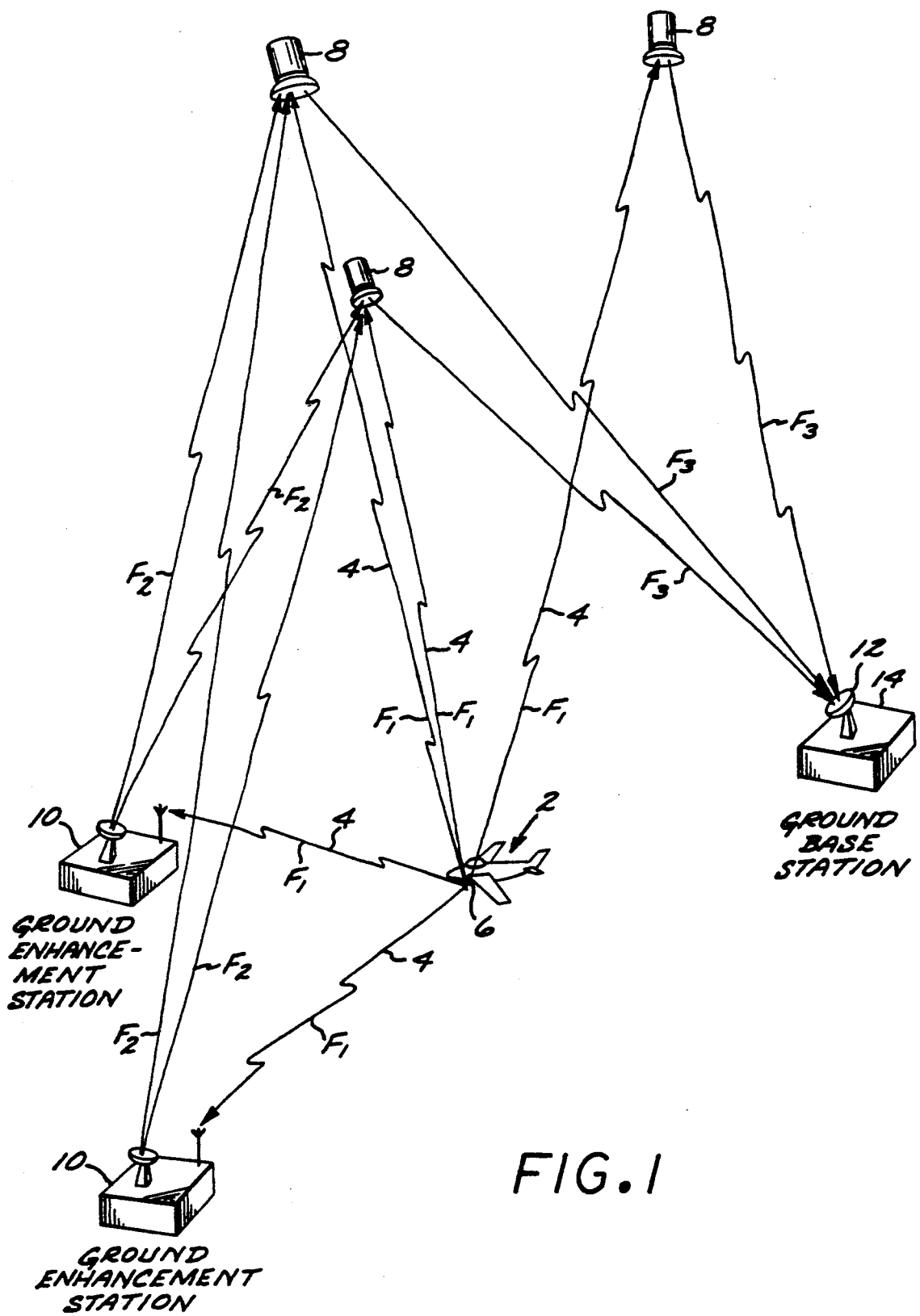
FIG. 1 is a schematic overview of an arrangement of the components and the airborne user in an embodiment of the present invention.

FIG. 1 illustrates the basic arrangement of the present invention in which airborne user 2 transmits a signal 4 on frequency $F_1$ through omnidirectional antenna 6. Such signal may be received by satellites 8 and ground enhancement stations 10. Ground enhancement stations 10 retransmit the signals received at frequency $F_1$ from user 2, to satellites 8 on frequency $F_2$ after a precise time delay and after including in the signal an indication of the ground enhancement station identification. The satellites 8 then retransmit the signal on Frequency $F_3$ to the antennas 12 of the ground base station 14. Ground base station 14 contains the ability to compute the location of airborne user 2 on the basis of the time differences of arrival (TDOA) of the signals transponded by satellites 8 and ground enhancement stations 10 and the known locations of each ground enhancement station and satellite. Thus, the present invention minimizes the cost and complexity associated with all of the elements of the system remote from ground base station 14 and provides a single source of information on the location of vehicles in the air traffic control system. At the aircraft owner's option, each aircraft may be equipped with a receiver which would be capable of receiving and decoding information from the central ground station 14 to provide the airborne user with an indication of his present position and any potential conflict with other airborne users. Such a signal could be relayed by either a satellite or a selected ground enhancement station within receiving range of the airborne user.

From the above it may be seen that the present invention provides important benefits compared to currently envisioned systems, in that the cost is dramatically reduced compared to systems that perform calculation onboard the user, thereby making the system available to the smaller, less affluent user. Thus, the present invention can promote air safety in that all users can be equipped with a transponder and be part of a national airspace system with resultant increased safety and enforceability.

Another important benefit to the present invention is its ability to provide accuracy of location that is not available with other systems without resorting to extremely accurate measurements of range from a large proliferation of satellites (e.g. the GPS system) or other complex adjuncts to the relatively simple system of the present invention. The GDOP for a generalized geometry between a fixed location and the elements of a hyperbolic navigation system is based upon a calculation of position from differences between time of receipt of a uniformly propagated signal.

GEOMETRIC DILUTION OF PRECISION

The effects of geometry on the performance of any radio-navigation system is expressed in terms of GDOP. For the case of satellite based systems, GDOP can be expressed as (for a given altitude input):

$$GDOP_a = \sqrt{\text{trace}(G_a R G_a)^{-1}} \tag{1}$$

where $$G_a = \begin{bmatrix} 0 & 0 & -1 & 0 \\ l_1 m_1 & n_1 & -1 \\ l_2 m_2 & n_2 & -1 \\ l_3 m_3 & n_3 & -1 \end{bmatrix} \tag{2}$$

and $$R = \begin{bmatrix} 1/u^2 & 0 & 0 & 0 \\ 0 & 1 & 0 & 0 \\ 0 & 0 & 1 & 0 \\ 0 & 0 & 0 & 1 \end{bmatrix} \quad (3)$$

Note, $l_i$, $m_i$, $n_i$ = the direction cosines from the user to the with satellite; subscript "a" refers to altimeter aiding; and u is the ratio of the altitude error to the random pseudorange error as given by:

$$u = \frac{\sigma_a}{\sigma_p} \quad (4)$$

While the development of GDOP derived here is based upon a fixed altitude input error, as will be discussed later, such assumption has direct relevance to the present invention, in that the link from user to ground enhancement station is a means of improving the estimate of altitude of the user compared to direct measurements of TDOAs at the satellites or ground base stations.

It is now possible to expand the expression for $GDOP_a$ and obtain a closed form solution. Noting $$(G_a R G_a)^{-1} = \frac{adj(G_a R G_a)}{det(G_a R G_a)} \quad (5)$$

$$= \frac{adj(G_a R G_a)}{det(G_a)det(R)det(G_a)} \quad (6)$$

$$= \frac{d}{D^2} \quad (7)$$

Substituting (7) into (1) yields $$GDOP_a = \frac{\sqrt{t}}{D} \quad (8)$$

where $t = trace(d)$.

Algebraic manipulation yields $$t = a_{33}[(a_{11} + 3)a_{22} - a_{42}^2 - a_{21}^2 + 3a_{11} - a_{41}^2] \quad (9)$$
$$- a_{43}^2(a_{11} + a_{22}) + 2a_{43}(a_{31}a_{41} + a_{32}a_{42})$$
$$- a_{32}^2(a_{11} + 3) + 2a_{21}a_{31}a_{32}$$
$$- a_{22}(a_{31}^2 - 3a_{11} + a_{41}^2)$$
$$- a_{11}a_{42}^2 + 2a_{41}a_{21}a_{42} - 3a_{31}^2 - 3a_{21}^2$$

where the $a_{ij}$s are functions of the direction cosines from the user to the three satellites being used in conjunction with the altimeter. These relationships are given by the following equations:

$$a_{11} = l_1^2 + l_2^2 + l_3^2 \quad (10)$$

$$a_{21} = l_1 m_1 + l_2 m_2 + l_3 m_3$$

$$a_{22} = m_1^2 + m_2^2 + m_3^3$$

$$a_{31} = l_1 n_1 + l_2 n_2 + l_3 n_3$$

$$a_{32} = n_1 m_1 + n_2 m_2 + n_3 m_3$$

$$a_{33} = n_1^2 + n_2^2 + n_3^2 + 1/u^2$$

$$a_{41} = -(l_1 + l_2 + l_3)$$

$$a_{42} = -(m_1 + m_2 + m_3)$$

$$a_{43} = -(n_1 + n_2 + n_3)$$

Similarly, by combining (6) and (7), it can be shown that $$D^2 = [(l_2 - l_1)(m_3 - m_2) - (l_3 - l_2)(m_2 - m_1)]^2/u^2. \quad (11)$$

The solution for $GDOP_a$ is therefore completely given in closed form by (8) through (11).

There are several interesting factors to note about the expression for $D^2$ given i (11). It is immediately obvious that it is independent of the $n_i$ direction cosines. This fact is of interest since the $n_i$ direction cosines refer to the local vertical direction, and hence would yield information analogous to that obtained through the use of an altimeter. This is of further consequence when it is realized that the expression for D is directly related to the volume of the tetrahedron that is formed by four points. In this case, the four points are defined by the unit vectors from the user to the three satellites and the altitude reference which can be considered to be a pseudosatellite located at the center of the earth. Thus, any improvement in the altitude reference has a direct relationship to reducing GDOP. The present invention provides this means of improving GDPO by use of the ground enhancement stations.

Figure 2:
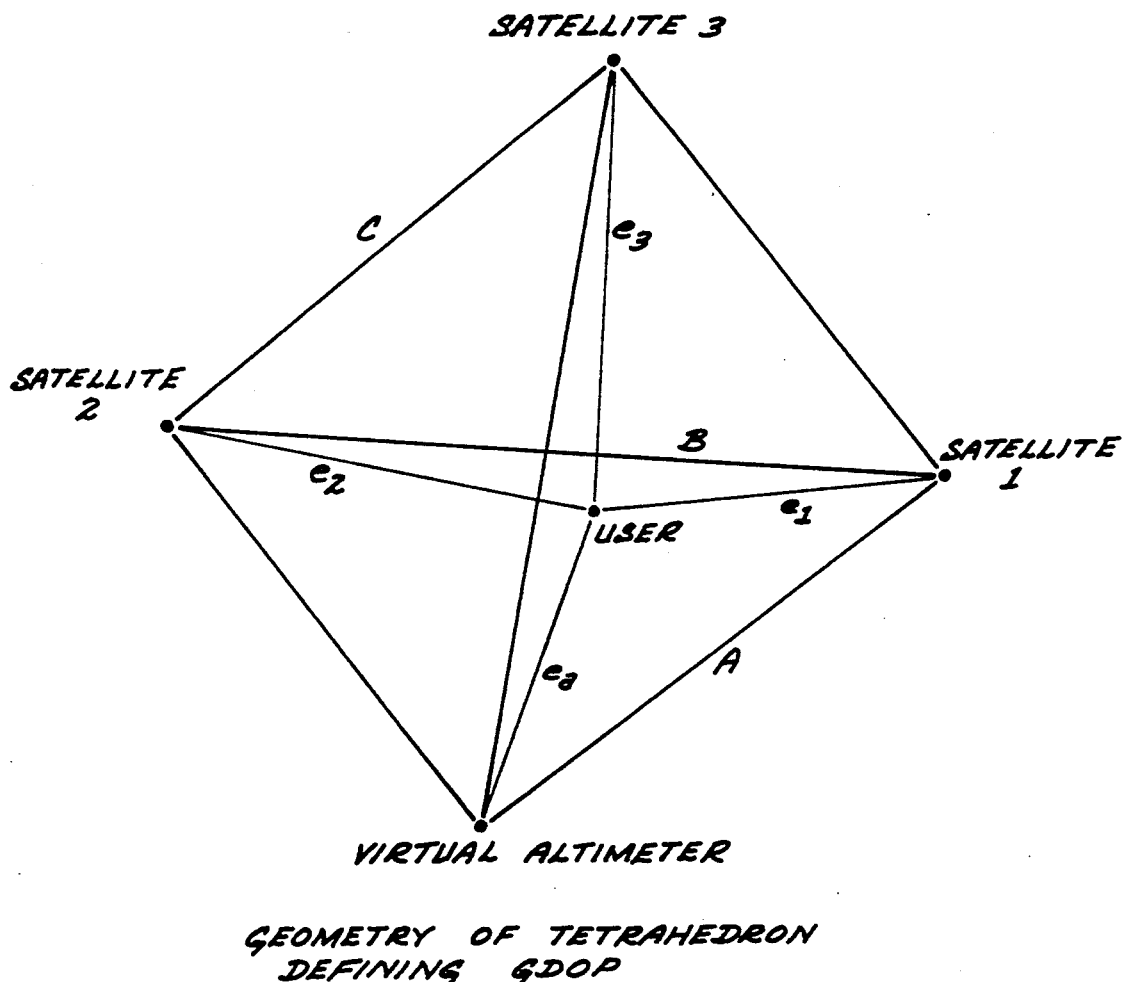
FIG. 2 is an illustration of the tetrahedron formed by the unit vectors from the user to the satellites of a vehicle location system.

Furthermore, it is known that the volume of the tetrahedron formed by these vectors is a fairly reliable indicator of GDOP. This can be seen from the relationship $$V = \frac{1}{6}(A \times B) \cdot C \quad (12)$$

for the tetrahedron depicted in FIG. 2. Note that the following definitions are used:

$V$ = volume of the tetrahedron $e_a$ = unit vector from user to altimeter (satellite at center of earth)

$e_1$ = unit vector from user to satellite 1

$e_2$ = unit vector from user to satellite 2

$e_3$ = unit vector from user to satellite 3

$A$ = vector from altimeter (satellite at center of earth) to satellite 1

$B$ = vector from satellite 1 to satellite 2

$C$ = vector from satellite 2 to satellite 3

It can be shown that $$(A \times B) \cdot C = det(G_a) \quad (13)$$

which yields $$(A \times B) \cdot C = [(l_2 - l_1)(m_3 - m_2) - (l_3 - l_2)(m_2 - m_1)] \quad (14)$$

It can readily be seen that this is similar to the expression given in (11). Therefore combining (11), (12), and (14) yields:

$$V = \frac{1}{6} Du \quad (15)$$

The relationship between the volume of the tetrahedron and $GDOP_a$ is therefore given by $$GDOP_a = \frac{u\sqrt{t}}{6V} \quad (16)$$

If it is assumed that t is nearly constant, it would be possible to minimize $GDOP_a$ by maximizing the volume of the tetrahedron. The validity of the constant t assumption has been verified by computer simulations comparing true $GDOP_a$ with the volume of the tetrahedron. In reality, it is known that t is not constant, but its variations may be small when compared to the divergencies in D.

From the above it can be seen that errors in altimeter input for satellite only based systems propogate as large GDOP errors for the system. By providing a more direct measurement of altitude by ranging to the ground enhancement stations, the present invention substantially reduces the errors that would otherwise be present in satellite based systems and reduces the GDOP errors associated with timing errors in the system.

Figure 3:
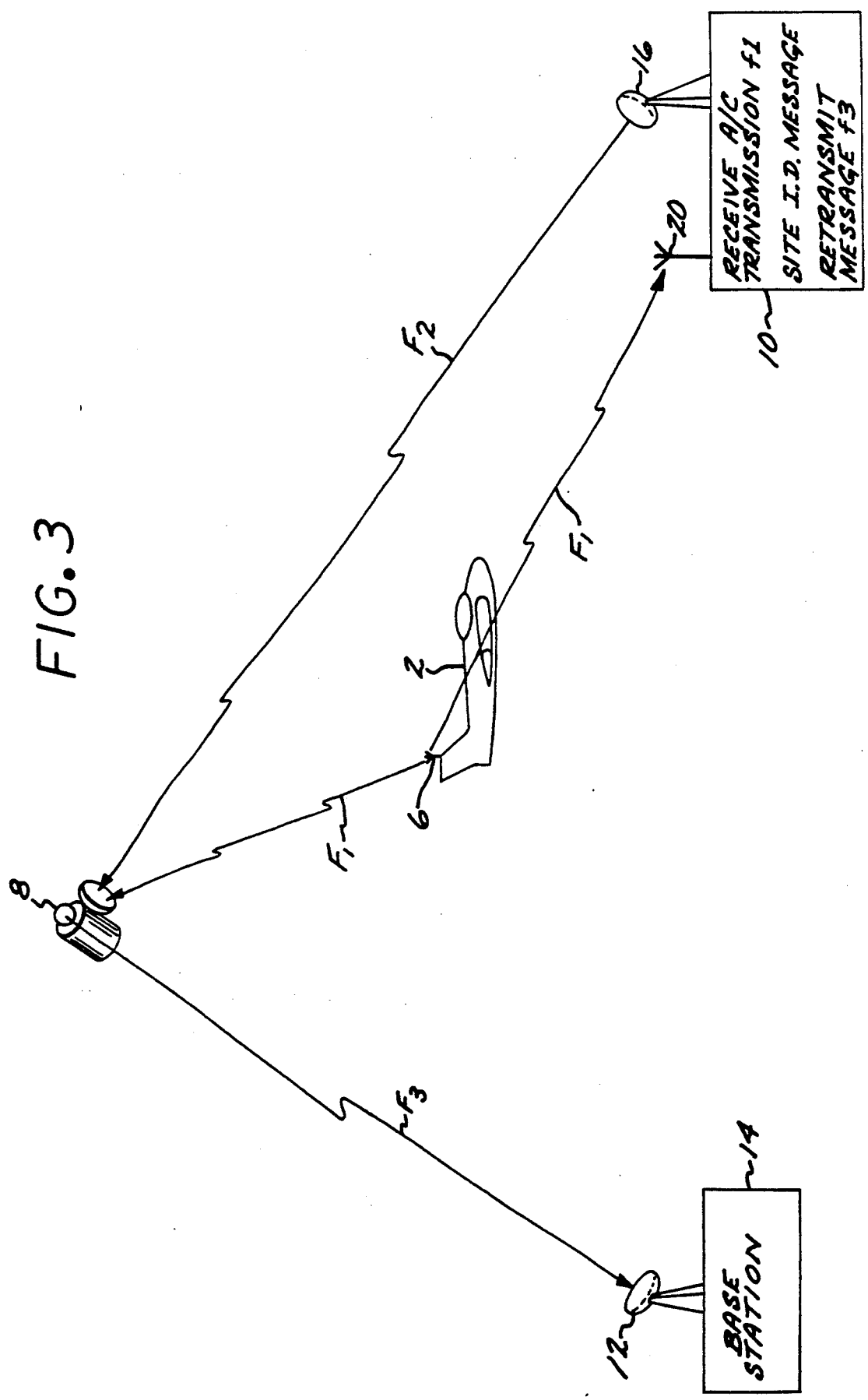
FIG. 3 is a schematic illustration of the components of an embodiment of the present invention illustrating a single user ground enhancement station, satellite repeater and ground base station for the purposes of simplicity.

FIG. 3 illustrates the operation of the system of the present invention which utilizes a ground enhancement station for the purpose of transponding the signal received from an aircraft to the satellite. Airborne user 2 transmits a signal on transmission frequency $F_1$ which is received by antenna 20 at ground enhancement station 10. The ground enhancement station then adds a site I.D. tag to the message and, after a precise time delay, retransmits the message on frequency $F_2$ from antenna 16. The signal on frequency $F_2$ is received by satellite 8 which incorporates a transponder capable of direct receipt of the signal on frequency $F_1$ from airborne user 2 or the I.D. tag message on frequency $F_2$ from ground enhancement station 10. The satellite retransmits the combined messages consisting of the transponded initial signal received on frequency $F_1$ from airborne user 2 and the transponded signal from ground enhancement station 10 on frequency $F_3$ on a new frequency $F_2$ to antenna 12 at ground base station 14.

A vehicle location system according to the present invention requires that there be at least four stations to which an airborne user may transmit in order to provide location in X, Y and Z relative to the earth's surface. Such a system may consist of one or more satellites and a plurality of ground stations and in one preferred embodiment a three satellite constellation may be used along with a plurality of ground stations to provide an over-determined system. Such a geometry requires that at least two of the ground stations be within the receiving range of the aircraft and are capable of retransmission of the received signal to at least two of the satellites in the constellation. Alternatively, a relatively larger number of ground stations may be used with relatively fewer satellites, provided that the criterion of at least four geometrically separated receiving sites are available. The addition of receiving sites in excess of the minimum number required improves the accuracy of the system and reduces the GDOP observed.

Figure 4:
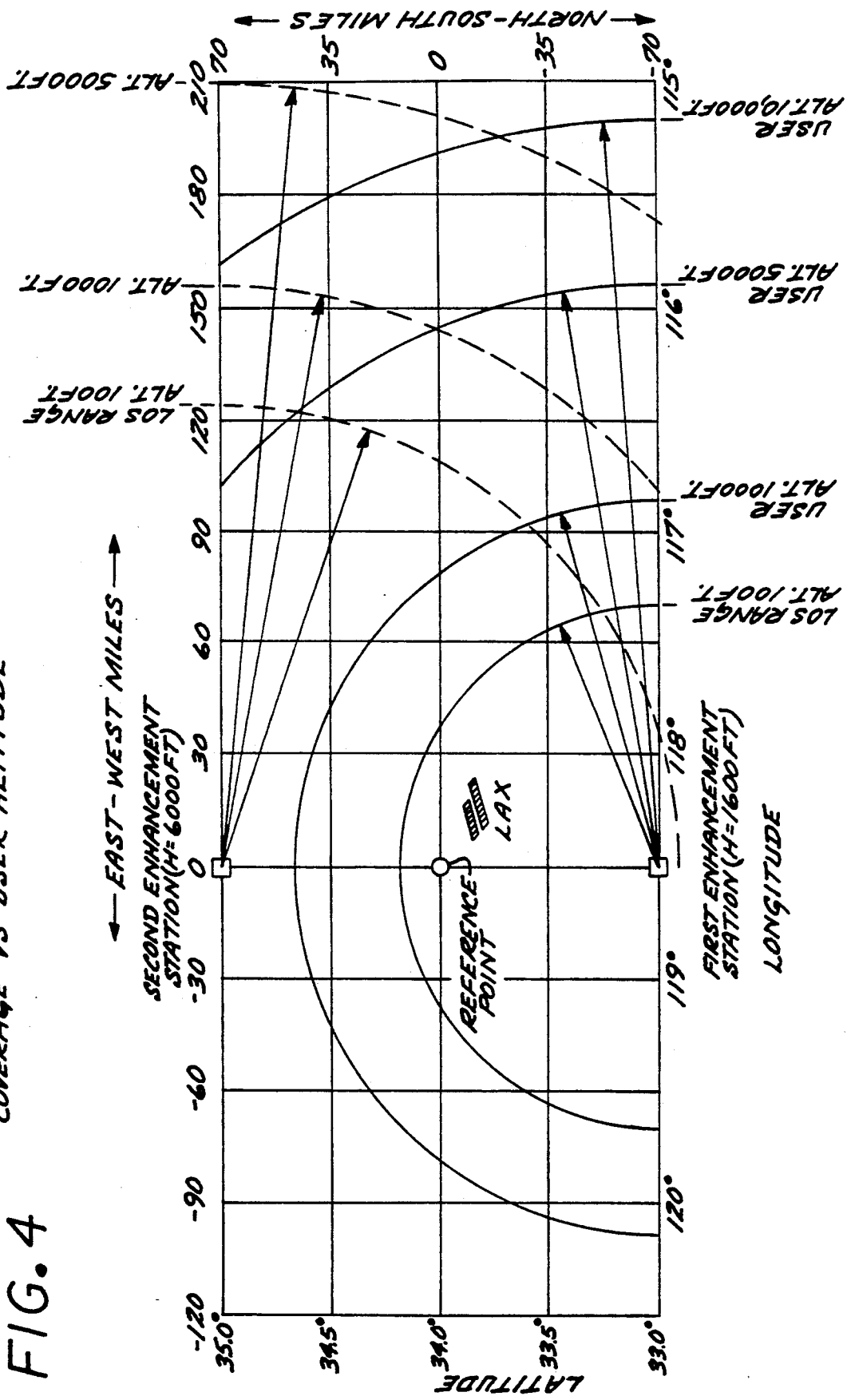
FIG. 4 is a graphic representation of enhancement station locations and coverage versus user typical altitude.

FIG. 4 is an illustration of typical ground enhancement station coverage. As shown by the graphic representation, the line of sight (LOS) range of the station is a function of the user altitude, the enhancement station altitude and the distance between enhancement stations. Thus, the coverage of the stations for users is on the order of 25 miles for the station geometry shown for user altitudes in excess of 100 feet. If a user altitude of 1,000 feet or above is used as a system minimum (a reasonable assumption for air traffic in populated areas, since air traffic is not permitted below this altitude unless actually in the process of landing or taking off), then coverage on the order of 150 miles can be achieved with the geometries shown.

Using the geometry of FIG. 4 and the mathematical basis for GDOP described above, GDOP has been calculated for representative "all satellite" systems and systems according to the invention. These results are tabulated in tables 1 and 2 for the reference point of FIG. 4 and a latitude midway between the ground enhancement stations. These calculations clearly show the dramatic reduction in GDOP available with the present invention. As illustrated by the GDOP numbers in tables 1 & 2, these reductions are on the order of 30,000:1 for typical geometries when the 4 satellite system is compared to a 3 satellite+2 ground enhancement station configuration according to the invention.

TABLE 1

| | GDOP VS LONGITUDE, REFERENCE LATITUDE = 34.0° | | | | | | |
|---|---|---|---|---|---|---|---|
| | 114 | 115 | 116 | 117 | 118 | 119 | 120 |
| 4 SAT | 71,290 | 87,184 | 83,640 | 60,560 | 57,870 | 55,508 | 53,428 |
| 3 SAT + 1 ENH. STA. | 60.09 | 41.31 | 26.82 | 15.99 | 9.56 | 8.14 | 9.34 |
| 3 SAT + 2 ENH. STA. | 3.10 | 2.88 | 2.56 | 2.19 | 1.81 | 1.83 | 2.28 |

TABLE 2

| | GDOP VS LONGITUDE REFERENCE LONGITUDE + 0.5 = 34.5° | | | | | | |
|---|---|---|---|---|---|---|---|
| | 114 | 115 | 116 | 117 | 118 | 119 | 120 |
| 4 SAT | 71,696 | 67,562 | 63,996 | 60,895 | 58,185 | 55,807 | 53,712 |
| 3 SAT + 1 ENH. STA. | 33.28 | 24.68 | 17.44 | 12.08 | 9.02 | 8.14 | 8.48 |
| 3 SAT + 2 ENH. STA. | 3.65 | 3.46 | 3.17 | 2.72 | 1.98 | 2.03 | 3.00 |

Figure 5:
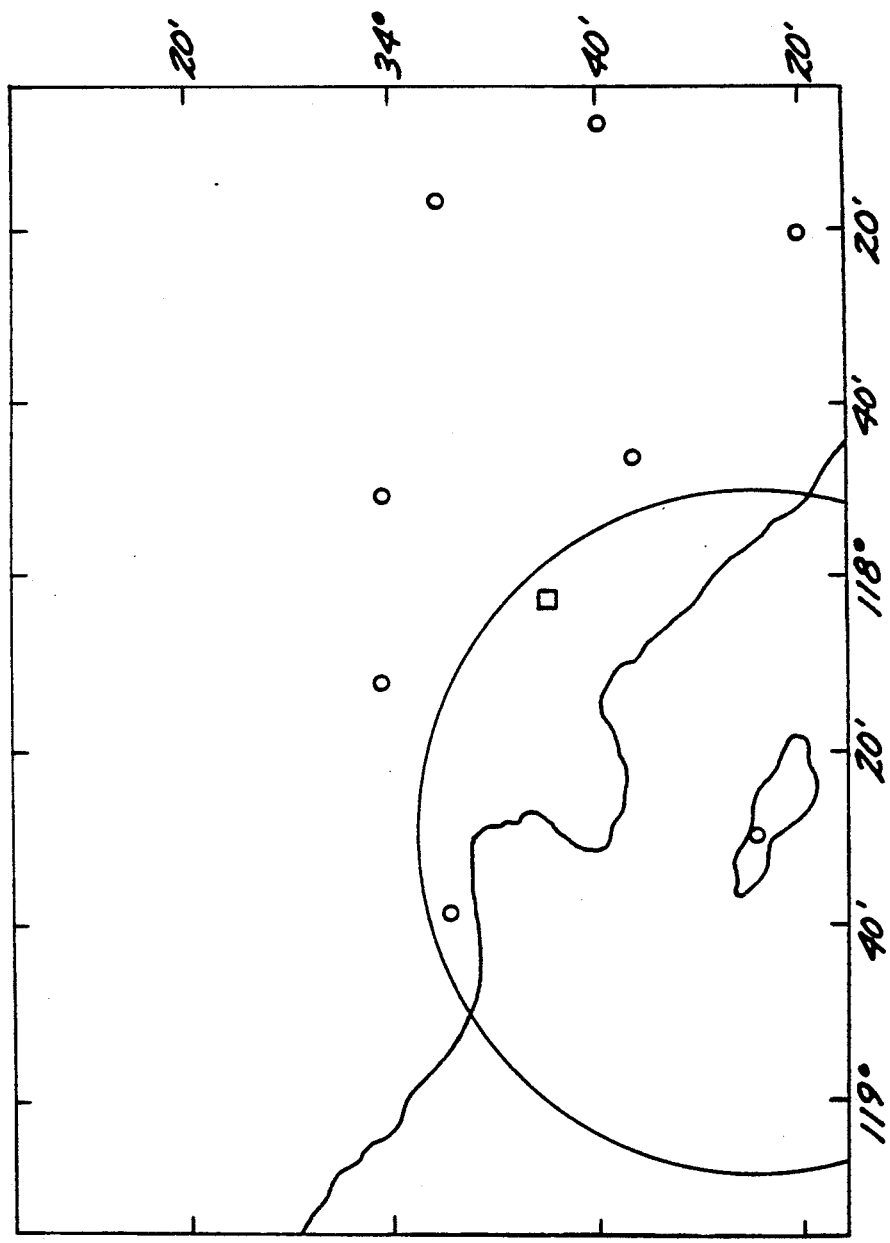
FIG. 5 is an exemplary distribution of a ground enhancement station deployment for the Southern California area illustrating ground enhancement stations placed at the higher elevations in the area.
Figure 6:
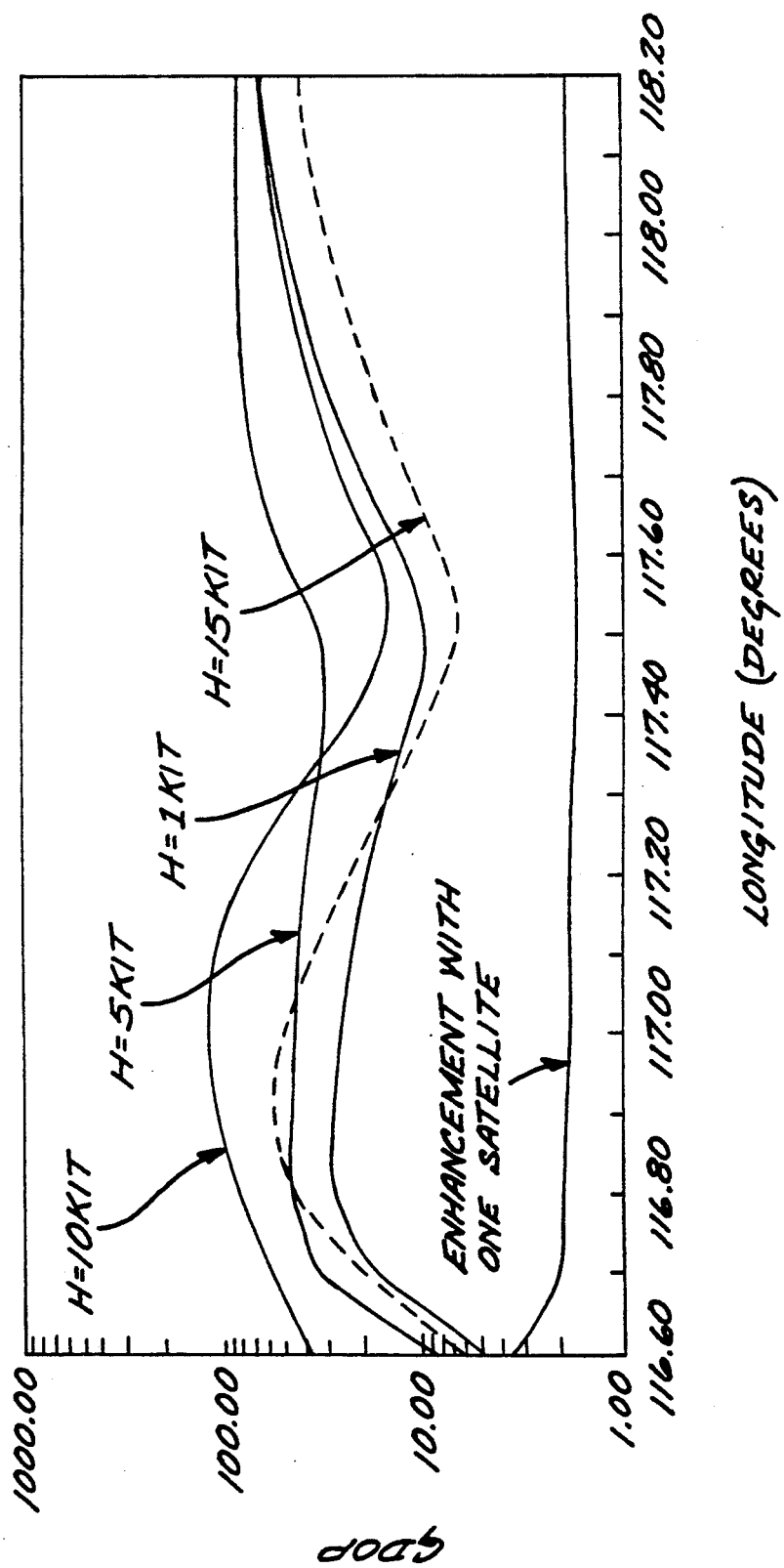
FIG. 6 is a graph of Geometric Dilution of Precision (GDOP) at a latitude of 33 40' as a function of longitude for the eight (8) ground enhancement stations of FIG. 4, illustrating the improvement in GDOP with the addition of one satellite to the basic ground enhancement station GDOP capability.

FIG. 6 is an illustration of the calculated GDOP versus longitude for an entirely earth based system incorporating earth stations of various heights above the earth's train with the stations chosen from the exemplary distribution of such earth stations illustrated in FIG. 5. A curve illustrating the improvement associated with addition of one satellite to the system is also shown. As the marked curves in FIG. 6 illustrate, the height of the ground enhancement station has a substantial effect upon the GDOP for an all ground based system. However, when a single satellite is added to the ground based geometry described in FIG. 4, GDOP is dramatically improved to less than 2.0 in the longitudes represented by the ground enhancement station geometry illustrated. Thus, the combination of at least one satellite with three or more ground enhancement stations within the communication line of sight of the airborne user provides nearly 2 orders of magnitude improvement in the GDOP associated with such a geometry compared to an all ground based system. Similarly, the use of a plurality of ground enhancement sites with a constellation of two or more satellites will dramatically reduce the GDOP which would otherwise be experienced for an all satellite system.

Figure 7:
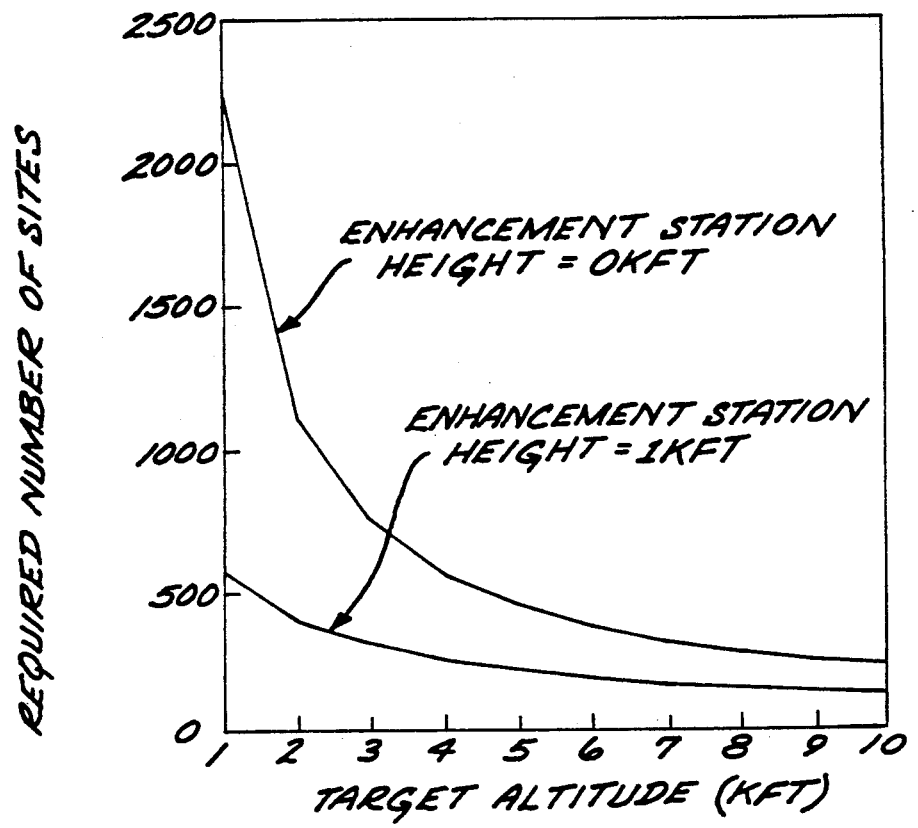
FIG. 7 is a graph of the number of sites required in one embodiment for a nationwide deployment of ground enhancement stations for the present invention as a function of aircraft altitude coverage for ground enhancement station heights above terrain of 0 feet, and 1,000 feet.

FIG. 7 illustrates the number of ground enhancement sites required to provide line of sight coverage from an aircraft to at least two enhancement sites throughout the continental United States for enhancement station heights of 1,000 feet and ground level and for an airborne user altitude varying between 1,000 and 10,000 feet. As may be seen from these curves, the number of enhancement stations required is dramatically reduced if an altitude for the enhancement station is chosen of only 1,000 feet above the terrain. In practical terms, such altitudes may not be necessary in areas where an extremely low variation in height of the highest features above the majority of the terrain is found and higher heights may be necessary in the vicinity of extremely rugged terrain. However, as a general rule, any increase in an enhancement station height will result in a corresponding decrease in the number of stations required for a given geographic coverage.

Figure 8:
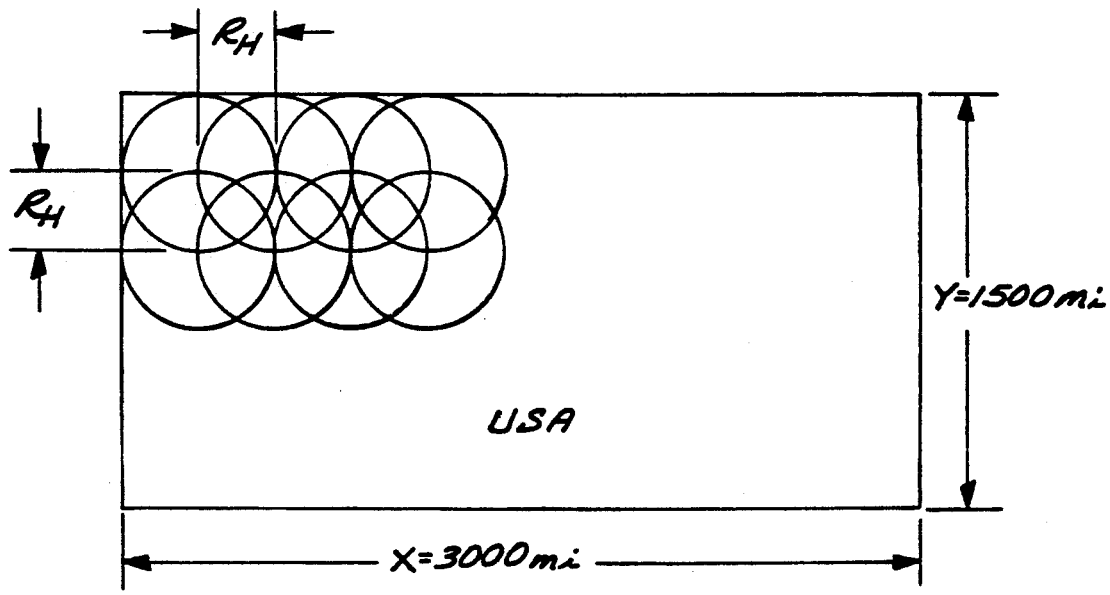
FIG. 8 is a representation of the geometric relationships associated with the derivation of the number of sites for a continental United States deployment in another embodiment of the present invention.

FIG. 8 illustrates the geometric formulation for deriving the number of sites in a continental United States (CONUS) deployment for the ground enhancement stations of the present invention. If the CONUS is represented by a rectangle of approximately 3,000 miles in breadth and 1,500 miles in height as illustrated in FIG. 8, spacing between ground enhancement stations may be represented by $R_H$ and the number of stations by the equation $N_S$ equals $(X \times Y/R_H^2)$ where $R_H$ is equal to $1.416 \times (\sqrt{A_T} + \sqrt{H_{ES}}) = $ line of sight range in miles.

$$N_S = \frac{XY}{R_H^2}$$

Figure 9:
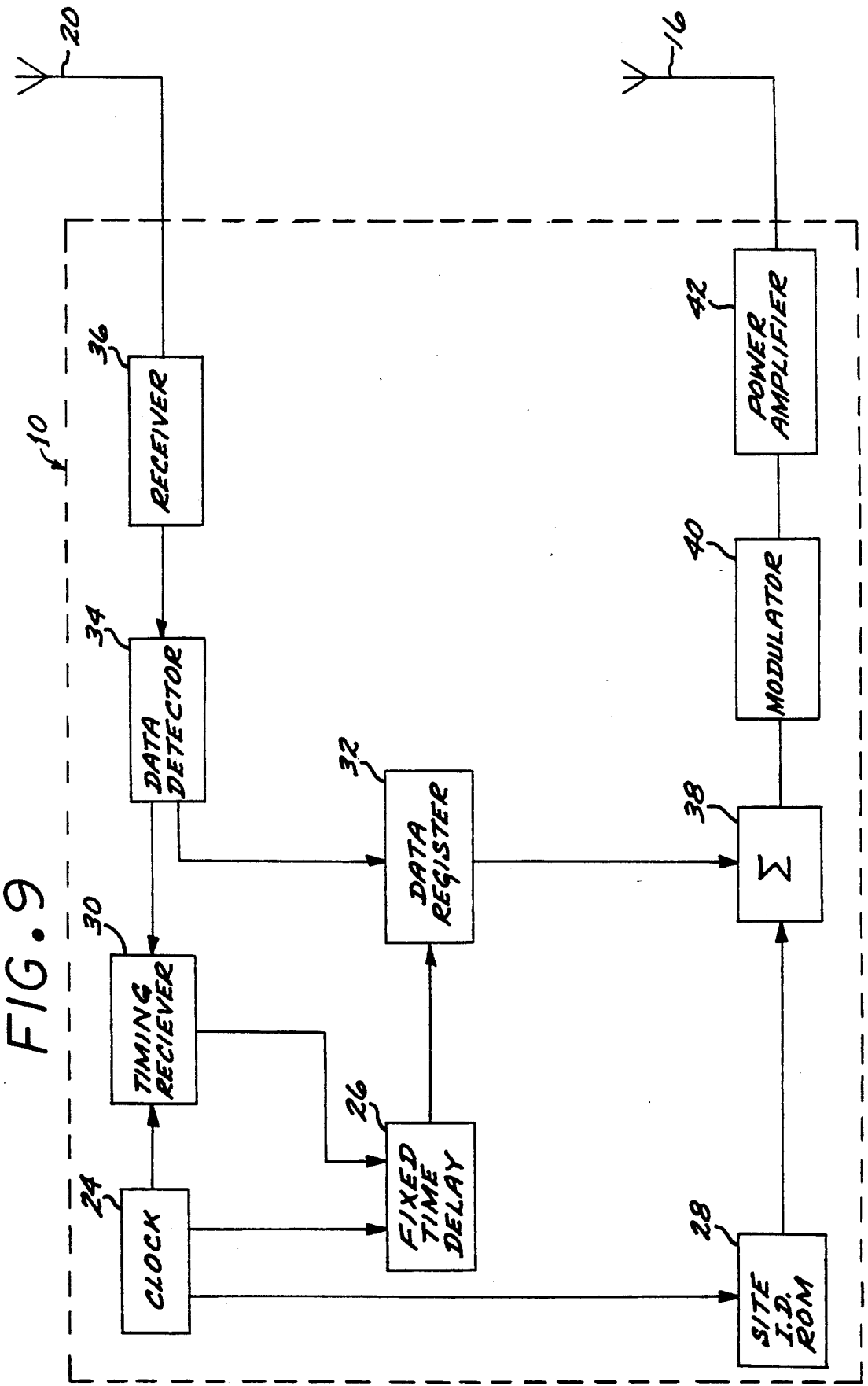
FIG. 9 is a schematic illustration of the arrangement of components of a ground enhancement station in accordance with the present invention.

Where
$N_S$ = Number of Enhancement Sites
$H_{ES}$ = Height of the Enhancement Station in Feet
$A_T$ = Altitude of the Target in feet FIG. 9 is an illustration of a basic block diagram associated with an embodiment of the ground enhancement station 10 of the present invention. A clock 24 provides a time standard to fixed time delay 6, site I.D. read only memory (ROM) 28 and to timing receiver 30. The output of time delay 26 is input to data register 32 which is driven by data detector 34 which accepts the signal from receiver 36 tuned to the frequency of the output of the user transmitter. These signals are summed by summer 38 to maintain synchronization of the output of the modulator 40. Power amplifier 42 is driven by modulator 40 and outputs the resulting signal to antenna 16 for connection to satellite 8 (FIG. 3).

Figure 10:
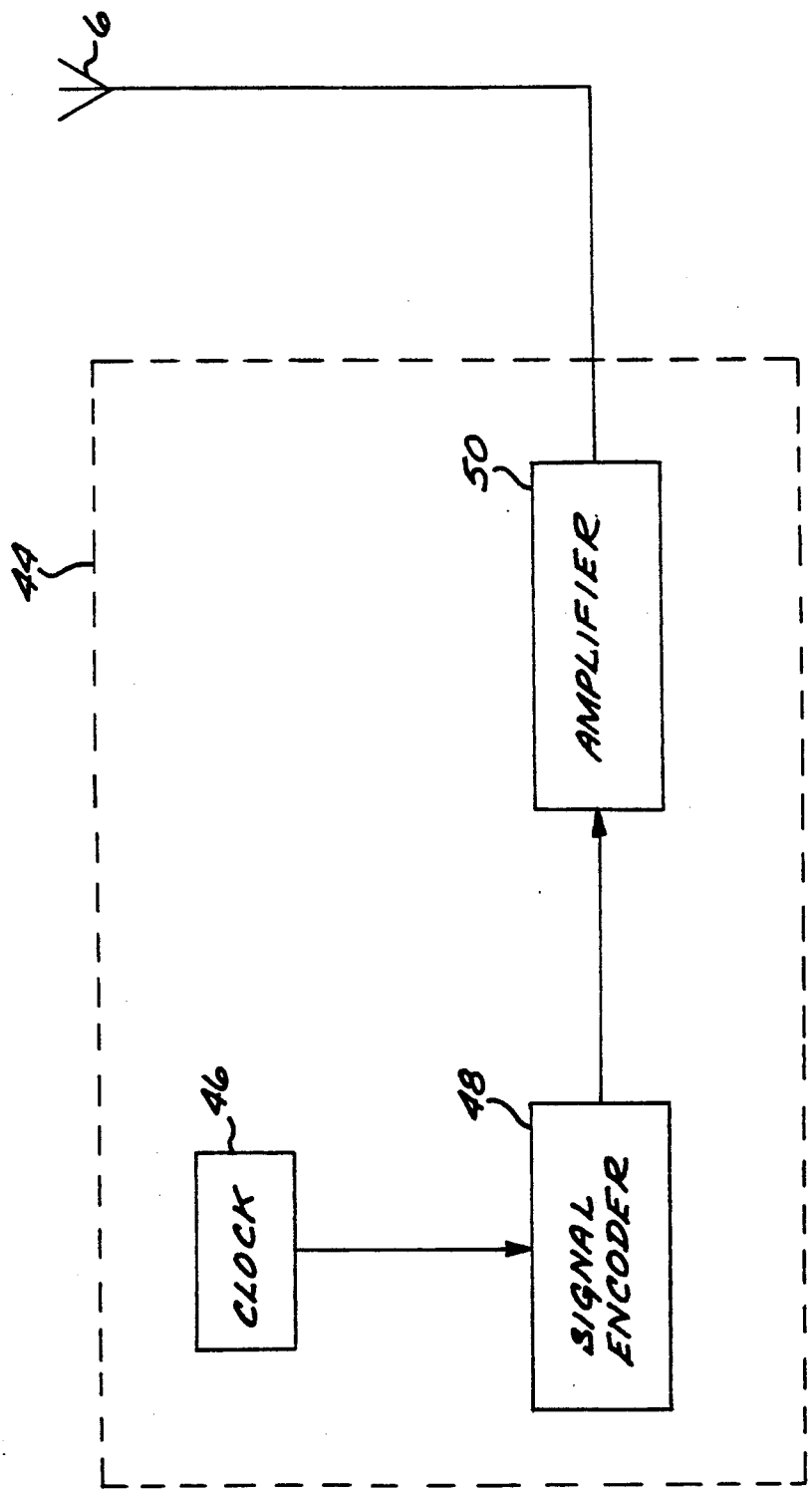
FIG. 10 is a schematic illustration of the arrangement of the components of the electronic transmitter system for an airborne user of an embodiment in accordance with the present invention.

FIG. 10 illustrates an arrangement of functions for an embodiment of the onboard transmitter of the airborne user of the present invention. The onboard transmitter 44 contains an oscillator clock reference unit 46 and the signal encoder 48 to provide an output signal fed to amplifier 50 and then to antenna 6. The waveform of the transmitted signal from transmitter 44 must be carefully controlled to allow measurement of the precise time of arrival of the signal transmitted from the transmitter through the transponders of the ground enhancement stations 10 and the satellites 8 to the ground base station 14. The waveform of the transmitted signal from the aircraft is identical to that utilized in the U.S. Pat. No. 4,740,792 referenced above.

Figure 11:
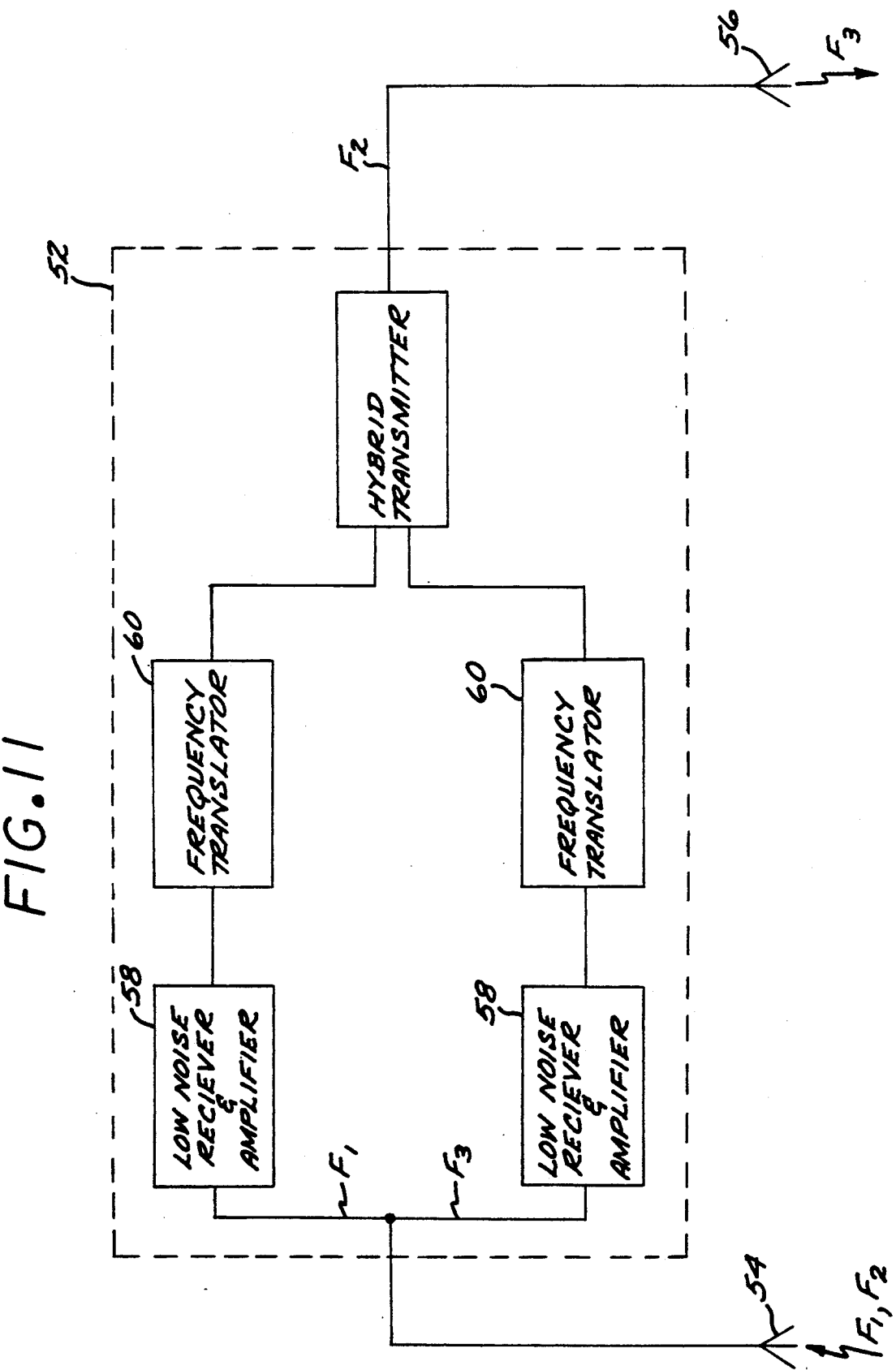
FIG. 11 illustrates the arrangement of the components in the satellite portion of an embodiment in accordance with the present invention.

FIG. 11 illustrates the arrangement of components for the satellites 8 to be used in the present invention. Such satellites may be geostationary satellites located at approximately equatorial elevations over the continental United States and spaced to provide visability of two or more satellites for any given airborne user. The satellites of the present system may incorporate a C Band or other suitable frequency transponder 52 designed to be a "bent pipe" amplifier and transponder for the signals received from the airborne user and the ground enhancement stations. The satellite would receive the transmissions from the airborne user 2 and the ground enhancement station 10 on the frequencies $F_1$, $F_2$ used in such transmissions at antenna 54 and for retransmission on a single frequency $F_3$ via antenna 56 to the ground base station 14 at which the computational capability required to locate the airborne user on the basis of the time delays measured resides. The transponder system utilizes low noise receivers 58 to separately process the frequencies $F_1$, $F_2$ received at antenna 54 and frequency translators 60 to convert those signals to inputs to hybrid transmitter 62 which outputs a composite signal containing the inputs at frequencies $F_1$ and $F_2$ for retransmission through antenna 56 at frequency $F_3$. Thus, the satellite component of the present invention avoids the necessity of placing complex electronics or computers in the satellite vehicle, thereby reducing the total cost required to deploy a vehicle location system.

FIG. 12 illustrates the arrangement of the ground base station 14 of the present invention. The radio frequency receiver section 64 contains receivers 66, 68, 70 that each receive the signals through antennas 72, 74, 76 respectively, that are tuned to individual satellites and aimed to receive their narrow frequency band and angle transmissions. Correlation section 78 of the base station incorporates correlators 80, 82, 84 to respectively receive outputs of receivers 66, 68, 70 and thereby process inputs to TDOA processor 86. These data are then output to a data processing digital computer 88 in which the location of the user is calculated on the basis of the TDOA signals. These locations can be output to user interface module 90 that contains modems 92 that provide access by users to the vehicle addresses and locations. The data processing computer may also be controlled and accessed by operator display/control console 94 and can provide control of TDOA processor 86.

From the above discussion, it may be seen that the present invention provides location accuracies for airborne users substantially superior to those available to entirely ground based, or entirely satellite based vehicle location systems. Furthermore, the invention minimizes the expense of system components for the airborne user satellites and ground enhancement stations while concentrating the computational and complex engineering components of the system in a relatively small number of earth base stations. The system may also incorporate means to transmit information regarding the location and potential collision conflict data to airborne users who are equipped with appropriate receivers. While particular forms of the invention have been illustrated and described it will also be apparent that various modifications may be made without departing from the spirit and scope of the invention. Accordingly, it is not intended that the invention be limited except by the appended claims.

What is claimed is:

1. A vehicle location system for locating the position of an airborne user vehicle, comprising:

a transmitter located aboard the user, said transmitter being capable of periodic transmission of a first signal unique to said user;

a plurality of ground enhancement stations, said ground enhancement stations being capable of receipt of said first signal from said user and retransmission thereof as a second signal after a predetermined time delay;

at least one satellite, said satellite being capable of receipt of said first signal transmitted from said user and said second signal retransmitted by said ground enhancement stations, said satellite further capable of retransmission of a single composite signal incorporating said first and second received signals; and a ground base station, said ground base station being capable of receipt of said composite signal from said at least one satellite, said ground base station incorporating computer means for calculating the position of said user from the known locations of said ground enhancement stations and said at least one satellite and from the time difference of arrival of said first signals transmitted directly from the user to the satellite and then to the ground base station and the second signals transmitted from the user and relayed by the ground enhancement stations to the satellite and then to the ground base station, said ground enhancement stations and said at least one satellite providing a ground reference combined with an aerial reference for reducing geometric dilution of precision errors and for improving accuracy in locating said airborne user vehicle.

2. The vehicle location system of claim 1 wherein said transmitter further comprises:

a digital radio transmitter, and said transmitter further comprising means for transmitting a spread spectrum pseudonoise digital radio signal.

3. The vehicle location system of claim 1 wherein each said ground enhancement station further comprises:

means for independently measuring the time of arrival of said signal from said user in reference to a time standard located at said ground enhancement station.

4. The vehicle location system of claim 1 wherein each said ground enhancement station further comprises:

means for identifing said retransmission of said signal transmitted from said user as a retransmitted signal from the particular ground enhancement station.

5. The vehicle location system of claim 1 wherein said system further comprises:

means for identifying said transmission of said signals as being originated from said satellite.

6. The vehicle location system of claim 1 wherein said means for retransmitting said signal from said satellite comprises:

a narrow beam electromagnetic transmitter antenna.

7. The vehicle location system of claim 6 wherein said means for receiving said signal from said satellite at said ground base station further comprises:

narrow beam antenna means for receiving said narrow beam electromagnetic transmissions from said satellite.

8. The vehicle location system of claim 7 wherein said vehicle location system further comprises:

a plurality of said satellites in communication with said ground base station.

9. The vehicle location system of claim 1 wherein said computer means for calculating the position of said user further comprises;

a digital computer.

10. A vehicle location system for locating the position of an airborne user, comprising:

at least one airborne user, said user equipped with a radio frequency transmitter, said radio frequency transmitter capable of periodic transmissions of a first radio signal encoded with an identification for said user;

a plurality of ground enhancement stations, said ground enhancement stations being capable of receipt of said first radio signals from said user and retransmission of said first radio signals as a second radio signal after a known time delay;

at least one satellite, said satellite incorporating means for receiving said first radio signals directly emanating from said user and said second radio signals retransmitted by said ground enhancement stations, said satellite further being capable of retransmission of said first and second radio signals;

a ground base station, said ground base station being capable of receipt of said retransmitted first and second radio signals from said satellite and the measurement of the time of arrival of said retransmitted first and second radio signals referenced to a time standard; and means for computing the location of said user on the basis of the known locations of said ground enhancement stations and said at least one satellite and the said time difference between the time of arrival of said first radio signals transmitted directly from the user to the satellite and then to the ground base station and the second radio signals transmitted from the user and relayed by the ground enhancement stations to the satellite and then to the ground base station, said ground enhancement stations providing a ground reference, said ground reference being combined with an aerial reference provided by said at least one satellite for reducing geometric dilution of precision and for improving accuracy in locating said airborne user.

11. The vehicle location system of claim 10 wherein each said ground enhancement station further comprises:

means for encoding said second radio signals with an identification of said ground enhancement station.

12. A system for location the position of an airborne user, comprising:
   a plurality of radio frequency transmitters, each of said transmitters transmitting radio signals according to a predetermined format unique to each of said transmitters at a first frequency, said transmitters adapted for use by a like number of users;
   a plurality of spaced apart, enhancement receiver/transmitter stations remote from said users, said enhancement stations configured for receiving said radio signals at a first frequency, for accurately delaying said received radio signals, for encoding an enhancement station identification code into the received radio signals and for retransmitting the delayed and encoded received signals at a second radio frequency;
   at least one satellite for receiving the radio frequency signals at said first frequency from said user transmitters and the time delayed and encoded radio frequency signals from said enhancement stations at said second frequency, said satellite further comprising means for retransmitting said signals received on said first frequency and said second frequency on a third frequency;
   a remote base station configured to receive said radio frequency signals at said third frequency; and
   computer means for calculating the location of said user on the basis of time delay of arrival of said receipt of said signal and information regarding the location of said enhancement stations and said satellite, said enhancement stations providing a ground reference, said ground reference being combined with an aerial reference provided by said at least one satellite for reducing geometric dilution of precision and for improving accuracy in locating said airborne users.

13. The vehicle location system of claim 12 wherein each said radio transmitter further comprises:
   a digital radio transmitter which transmits a pseudo-random digital code corresponding to said unique identification of each of said users.

14. The vehicle location system of claim 12 which further comprises:
   a plurality of said satellites in communication with said base station.

15. The vehicle location system of claim 1 wherein said user transmitter comprise means for transmission of said signal at a first frequency F1, said ground enhancement stations include means for retransmission of said signal at a second frequency F2, and said satellite includes means for retransmission of said composite signal at a third frequency F3.

16. The vehicle location system of claim 1 wherein the number of said ground enhancement stations and said at least one satellite aggregates at least four in order to provide location in X, Y and Z relative to the earth's surface.

17. The vehicle location system of claim 16 wherein the number of said satellites is three, and further comprising a plurality of ground enhancement stations, said ground enhancement stations and said satellites being located such that at least two of the ground enhancement stations are within the receiving range of the signal transmitted by said airborne user and are capable of retransmission of the received signal to at least two of said satellites, thereby providing an overdetermined system.

18. The vehicle location system of claim 17 wherein said satellites are geostationary satellites located at approximately equatorial elevations over the continental United States.

19. The vehicle location system of claim 10 wherein said user transmitter comprise means for transmission of said signal at a first frequency F1, said ground enhancement stations include means for retransmission of said signal at a second frequency F2, and said satellite includes means for retransmission of said composite signal at a third frequency F3.

20. The vehicle location system of claim 10 wherein the number of said ground enhancement stations an said at last one satellite aggregates at least four in order to provide location in X, Y and Z relative to the earth's surface.

21. The vehicle location system of claim 20 wherein the number of said satellites is three, and further comprising a plurality of ground enhancement stations, said ground enhancement stations and said satellites being located such that at least two of the ground enhancement stations are within the receiving range of the signal transmitted by said airborne user and are capable of retransmission of the received signal to at least two of said satellites, thereby providing an overdetermined system.

22. The vehicle location system of claim 21 wherein said satellites are geostationary satellites located at approximately equatorial elevations over the continental United States.

23. The vehicle location system of claim 12 wherein the number of said ground enhancement stations and said at least one satellite aggregate at least four in order to provide location in X, Y and Z relative to the earth's surface.

24. The vehicle location system of claim 23 wherein the number of said satellites is three, and further comprising a plurality of ground enhancement stations, said ground enhancement stations and said satellites being located such that at least two of the ground enhancement stations are within the receiving range of the signal transmitted by said airborne user and are capable of retransmission of the received signal to at least two of said satellites, thereby providing an overdetermined system.

25. The vehicle location system of claim 24 wherein said satellites are geostationary satellites located at approximately equatorial elevations over the continental United States.

26. A method for locating the position of an airborne user, said method comprising the steps of:
   transmitting a radio signal at a first frequency at periodic intervals by said airborne user for defining an address unique to said airborne user;
   receiving said radio signals transmitted at said first frequency at at least one of a plurality of remote enhancement stations and retransmitting said radio signals at a second frequency after a known time delay for communicating said unique address of said airborne user, said retransmitted radio signals being encoded for identifying said remote enhancement station;
   receiving said radio signals transmitted at said first frequency from said airborne user at at least one satellite for providing a first reference for locating said airborne user and receiving said radio signals retransmitted at said second frequency at said satellite for providing a second reference for locating said airborne user;

retransmitting said radio signals received at said satellite at said first and second frequencies to a remote base station at a third frequency for determining the location of said airborne user; and evaluating said radio signals retransmitted to said remote base station at said third frequency for calculating the location of said airborne user based upon known locations of said remote enhancement stations, said satellite, said remote base station and the time difference of arrival of said signals from said satellite.

27. The method of claim 26 further comprising the step of using radio frequency electromagnetic waves for said signal transmissions.

28. The method of claim 26 further comprising the step of using a digital computer for calculating the location of said airborne user.

29. The method of claim 26 further comprising the step of locating said remote enhancement stations and said satellite on the basis of transmission from said remote enhancement stations and said satellite.

30. The method of claim 26 further comprising the step of providing the location of said airborne user to said airborne user.

31. The method of claim 27 further comprising the step of using a pseudo-random digital code for transmitting said signals.

32. The method of claim 30 further comprising the step of using a plurality of spread spectrum frequencies for transmitting said signals.

33. A vehicle location system for locating the position of an airborne user vehicle comprising, in combination:
a transmitter located aboard the user, said transmitter being capable of periodic transmission of a first signal unique to said user;
a plurality of ground enhancement stations, said ground enhancement stations being dedicated to receipt of said first signal from said user and retransmission of said first signal as a second signal after a predetermined time delay;
at least one satellite, said satellite being capable of receipt of said first signal transmitted from said user and said second signal retransmitted by said dedicated ground enhancement stations, said satellite further capable of retransmission of a single composite signal incorporating said first and second received signals; and
a ground base station, said ground base station being capable of receipt of said composite signal from said at least one satellite, said ground base station incorporating computer means for calculating the position of said user from the known locations of said ground enhancement stations and said at least ne satellite and from the time difference of arrival of said first signals transmitted directly from the user to the satellite and then to the ground base station and the second signals transmitted from the user and relayed to the ground enhancement stations to the satellite and then to the ground base station, said ground enhancement stations providing a ground reference, said ground reference being combined with an aerial reference provided by said at least one satellite for reducing geometric dilution of precision and for improving accuracy in locating said airborne user.

34. A vehicle location system for determining the position of an airborne user comprising:
(a) transmitter means located on said airborne user for transmitting a user signal containing a unique code identifying said airborne user;
(b) at least four geometrically separated receiving stations for receiving user signals directly from said airborne user and retransmitting said user signals, the location of each of said at lest four geometrically separated receiving stations being accurately known, at least one of said receiving stations being a satellite and at least one of said receiving stations being a ground based-enhancement station;
(c) the retransmitted user signals from each of said at least one ground-based enhancement station having means for identifying the ground-based enhancement station from which they are retransmitted;
(d) the retransmitted user signals from each of said at least one satellite having means for identifying the satellite from which they are retransmitted; and
(e) a base station for receiving said retransmitted user signals from said at least four geometrically separated receiving stations; and
(f) means for computing the location of said airborne user based on the known locations of said at least four geometrically separated receiving stations and any time difference between the arrival of user signals retransmitted by the at least four geometrically separated receiving stations.

35. A vehicle location system as in claim 34 wherein said at least four geometrically separated receiving stations include three satellites.

36. A vehicle location system as in claim 34 wherein said at least four geometrically separated receiving stations include two satellites and two ground-based enhancement stations.

37. A vehicle location system as in claim 34 wherein:
(a) the retransmitted user signals from each of said at least one ground-based enhancement station is transmitted to at least one of said at lest one satellite and then retransmitted to said base station; and
(b) the means for computing computes the location of said airborne user based on the known locations of said at least four geometrically separated receiving stations and any time difference between the arrival of user signals retransmitted by the at least one satellite to said base station.

38. A vehicle location system as in claim 34 wherein:
(a) said at least four geometrically separated receiving stations includes at least three satellites and at least two ground-based enhancement stations for receiving user signals directly from said airborne user and retransmitting said user signals;
(b) the retransmitted user signals from two of said least two ground based enhancement stations being transmitted to at least of said satellites and then retransmitted by said satellites to said base station; and
(c) the means for computing computing the location of said airborne user based on the known locations of said at least three satellites and at least two ground stations and any time difference between the arrival of user signals retransmitted by the at least three satellites to said base station.

39. A vehicle location system as in claim 34 wherein:
(a) the user signal transmitted from the airborne user is transmitted at a first frequency;

(b) the user signal retransmitted from the at least one ground-based enhancement station is transmitted at a second frequency; and
(c) the user signal retransmitted from the at least one satellite is transmitted at a third frequency.

40. A vehicle location system as in claim 34 wherein the user signals received by each said at least one ground-based enhancement station are delayed by a precise period of time before retransmission.

41. A vehicle location system as in claim 34 wherein each of said ground based enhancement stations retransmits said user signals on new frequencies to allow simultaneous retransmission of said user signals from different users.

42. A vehicle location system as in claim 34 wherein the base station and one of said at least one ground base enhancement station are at the same location.

* * * * *